US010601589B1

(12) United States Patent
Prokopenya et al.

(10) Patent No.: US 10,601,589 B1
(45) Date of Patent: Mar. 24, 2020

(54) COMPUTER SYSTEMS DESIGNED FOR INSTANT MESSAGE COMMUNICATIONS WITH COMPUTER-GENERATED IMAGERY COMMUNICATED OVER DECENTRALISED DISTRIBUTED NETWORKS AND METHODS OF USE THEREOF

(71) Applicants: Viktor Prokopenya, London (GB); Yury Hushchyn, Gibraltar (GI); Nikolay Voronetskiy, Minsk (BY); Kanstantsin Zakharchanka, Minsk (BY)

(72) Inventors: Viktor Prokopenya, London (GB); Yury Hushchyn, Gibraltar (GI); Nikolay Voronetskiy, Minsk (BY); Kanstantsin Zakharchanka, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 16/506,819

(22) Filed: Jul. 9, 2019

Related U.S. Application Data (60) Provisional application No. 62/698,713, filed on Jul. 16, 2018.

(51) Int. Cl.
*H04L 9/08* (2006.01)
*H04L 9/30* (2006.01)
*H04L 9/14* (2006.01)

(52) U.S. Cl.
CPC .......... *H04L 9/0844* (2013.01); *H04L 9/0869* (2013.01); *H04L 9/0894* (2013.01); *H04L 9/14* (2013.01); *H04L 9/3073* (2013.01)

(58) Field of Classification Search
CPC . H04L 9/08; H04L 9/30; H04L 9/0844; H04L 9/0869; H04L 9/0894; H04L 9/14; H04L 9/3073
See application file for complete search history.

(56) References Cited

U.S. PATENT DOCUMENTS

| 7,181,017 | B1 * | 2/2007 | Nagel | ................... H04L 9/0825 380/282 |
|---|---|---|---|---|
| 8,478,893 | B2 | 7/2013 | Hiie | |
| 9,177,157 | B2 | 11/2015 | Binder | |
| 9,584,493 | B1 | 2/2017 | Leavy et al. | |
| 9,634,995 | B2 | 4/2017 | Binder | |

(Continued)

*Primary Examiner* — Jayesh M Jhaveri
(74) *Attorney, Agent, or Firm* — Greenberg Traurig, LLP (57) ABSTRACT

The exemplary inventive instant messaging system may include a sending client that accesses encryption data associated with a receiving client on a distributed mesh network where the encryption data is signed by a receiver public key of the receiving client, forms a non-interactive message exchange session on the distributed mesh network, generates a first session key based on the encryption data and a sender secret key, encrypts a message using the first session key, encrypts session information using the receiver public key, produces a session state including the encrypted message and the encrypted session information and stores the session state in the non-interactive message exchange session. The receiving client accesses the session state, decrypts the encrypted session information with a receiver secret key, generates a second session key using the session information and a sender public key, and decrypts the message using the second session key.

20 Claims, 2 Drawing Sheets

(56) References Cited

U.S. PATENT DOCUMENTS

| | | | |
|---|---|---|---|
| 2007/0162605 A1* | 7/2007 | Chalasani | H04L 51/04 709/227 |
| 2009/0144380 A1 | 6/2009 | Kallman et al. | |
| 2016/0219024 A1 | 7/2016 | Verzun et al. | |
| 2017/0041296 A1 | 2/2017 | Ford et al. | |
| 2019/0215729 A1* | 7/2019 | Oyman | H04W 28/20 |

* cited by examiner

COMPUTER SYSTEMS DESIGNED FOR INSTANT MESSAGE COMMUNICATIONS WITH COMPUTER-GENERATED IMAGERY COMMUNICATED OVER DECENTRALISED DISTRIBUTED NETWORKS AND METHODS OF USE THEREOF

CROSS-REFERENCE TO RELATED APPLICATIONS

This application claims benefit of U.S. provisional patent application Ser. No. 62/698,713 filed Jul. 16, 2018, which is herein incorporated by reference for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Banuba Limited, All Rights Reserved.

FIELD OF TECHNOLOGY

The present disclosure generally relates to improved computer-based platforms/systems, improved computing devices/components and/or improved computing objects configured for one or more novel technological applications of distributed networking utilizing a plurality of computing devices networked to form a mesh network for communicating and storing information.

BACKGROUND OF TECHNOLOGY

A computer network system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary computer-based method that includes at least the following steps of accessing, with a sending client, encryption data associated with a receiving client on a distributed mesh network, where the distributed mesh network includes a plurality of nodes coordinated to route message and where the encryption data is signed by a receiver public key associated with the receiving client. Forming, by a processor of the sending client, a non-interactive message exchange session on the distributed mesh network. Generating, by the processor, a first session key based on at least the encryption data and a sender secret key associated with the sending client. Encrypting, by the processor, a message using the first session key to produce an encrypted message. Encrypting, by the processor, session information using the receiver public key to produce encrypted session information. Producing, by the processor, a session state including, the encrypted message, and the encrypted session information. Storing the session state in the non-interactive message exchange session on the distributed mesh network. The receiving client is configured to access the session state in the non-interactive message exchange session on the distributed mesh network, decrypt the encrypted session information with a paired receiver secret key paired with the receiver public key to reproduce the session information, generate a second session key using the session information and a sender public key paired with the sender secret key, and decrypt the message using the second session key.

In some embodiments, the present disclosure provides an exemplary computer-based method that includes at least the following steps of storing, with a receiving client, on a distributed mesh network a receiver public key and encryption data associated with the receiving client, where the distributed mesh network includes a plurality of nodes coordinated to route message, where the encryption data is signed by a receiver public key associated with the receiving client, and where a sending client is configured to access the distributed mesh network to extract the receiver public key and the encryption data; form a non-interactive message exchange session on the distributed mesh network; generate a first session key based on at least the encryption data and a sender secret key associated with the sending client; encrypt a message using the first session key to produce an encrypted message; encrypt session information using the receiver public key to produce encrypted session information; produce a session state comprising the encrypted message and the encrypted session information; and store the session state in the non-interactive message exchange session on the distributed mesh network. Decrypting, by a processor of the receiving client, the encrypted session information with a paired receiver secret key paired with the receiver public key to reproduce the session information. Generating, by the processor, a second session key using the session information and a sender public key paired with the sender secret key, and decrypting, by the processor, the message using the second session key.

In some embodiments, the present disclosure provides an exemplary computer-based system that includes at least the following components of a distributed mesh network comprising a plurality of clients, where the distributed mesh network includes a plurality of nodes coordinated to route message; a first client of the plurality of clients, including at least a first processing device; and a second client of the plurality of clients, including at least a second processing device. The first client is configured to: access encryption data associated with a second client of the plurality of clients; wherein the encryption data is signed by a second public key associated with the second client; form a non-interactive message exchange session on the distributed mesh network; generate a first session key based on at least the encryption data and a first secret key associated with the first client; encrypt a message using the first session key to produce an encrypted message; encrypt session information using the second public key to produce encrypted session information; produce a session state including the encrypted message, and the encrypted session information; and store the session state in the non-interactive message exchange session on the distributed mesh network. The first client is configured to decrypt the encrypted session information with a paired second secret key paired with the first public key to reproduce the session information; generate a second session key using the session information and a first public key paired with the first secret key; and decrypt the message using the second session key.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DESCRIPTION OF ILLUSTRATIVE EXAMPLES

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

As used herein, the term "user" shall have a meaning of at least one user.

In some embodiments, the present invention provides an exemplary inventive instant messaging (IM) computer system that is based on a decentralised distributed network capable to send and receive both real-time and delayed messages encrypted with one or more end-to-end encryption methodologies without the use of a central server. For example, as detailed herein, the present invention allows sending real-time messages when the sender(s) and/or the recipient(s) are online, delayed messages when the sender(s) and/or recipient(s) are offline, and transferring any type of content, including but not limited to, media content (e.g., video, audio, livestream, images, etc.).

In some embodiments, the present invention provides the exemplary inventive IM computer system that is configured to offer real-time or quasi real time quick transmission of written and/or media-based messages from sender to receiver over a network (such as the Internet) (Instant Messaging). In some embodiments, in push mode between two or more people using personal computers (PCs), mobile phones, smart phones or other devices, the exemplary inventive IM computer system may be configured to offer the IM in forms of point-to-point communications (peer-to-peer), multicast communications from one sender to many receivers, and other suitable communications that may include, but not limited to, live voice and/or video calling, video chat, inclusion of hyperlinks to media, images, video messages, audio media messages, Voice over Internet Protocol (VoIP) calls, as well as share diverse contents and information from photos, videos, voice messages, URL links to various information, and etc. In some embodiments, the present invention provides the exemplary inventive IM computer system that is configured to have no limits to the number of users to join in IM group chat. In some embodiments, the present invention provides the exemplary inventive IM computer system that is configured to be cross-platform by being configured to interact with and/or executed on various operating systems and hardware solutions such as, but not limited to, iOS, Microsoft Windows, Android, Blackberry, Bada OS, and/or Google Chrome OS (operating system).

In some embodiments, the present invention provides the exemplary inventive IM computer system that is configured to allow users to exchange passwords and/or cryptographic keys with peers to form the inventive decentralised IM network. In some embodiments, the present invention provides the exemplary inventive IM computer system that is configured to support both friend-to-friend and group-based communication interactions. In some embodiments, the present invention provides the exemplary inventive IM computer system that is configured to support automatic anonymous forwarding. In some embodiments, the present invention provides the exemplary inventive IM computer system that is configured, for group-based interactions, to allow any user to connect to any other without compromising users' privacy.

In some embodiments, the present invention provides an exemplary IM messenger application (client) that is configured as detailed herein to allow its users to interact utilizing the exemplary inventive IM computer system. In some embodiments, the exemplary IM messenger application (client) that is configured to allow its users to interact utilizing the exemplary inventive IM computer system when there would be no ability to save the generated temporary key on the user's device and/or avoiding the delaying communications between user(s) who are offline (allowing for delayed sessions).

In some embodiments, the exemplary IM messenger application (client) with the exemplary inventive IM computer system are configured to allow its users to send and/or receive messages encrypted by the end-to-end encryption when an interactive communication protocol cannot be used.

In some embodiments, the exemplary IM messenger application (client) with the exemplary inventive IM computer system are configured to have at least one or more of the following features:
1) maintaining a decentralized network;
2) preserving offline messages over an extended period of time (long lasted) (e.g., minutes, hours, days, etc.);
3) establishing/maintaining shared state without the use of super-node(s);
4) maintaining end-to-end (E2E) encryption;
5) maintaining account info without a need for offline memory storage; and
6) maintaining non-interactive E2E encryption.

In some embodiments, the exemplary IM messenger application (client) with the exemplary inventive IM computer system are configured to encrypt interactions by utilizing deniable encryption methodologies. For example, in some embodiments, the exemplary IM messenger application (client) with the exemplary inventive IM computer system are configured so that, for example, without limitation, the receiver can share a set of ephemeral keys in addition to the public key with the sender, and, in turn, the sender randomly combines the set of ephemeral keys to get the session key. See e.g., Canetti R., Dwork C., Naor M., Ostrovsky R. (1997) Deniable Encryption. In: Kaliski B. S. (eds) Advances in Cryptology—CRYPTO '97. CRYPTO 1997. Lecture Notes in Computer Science, vol 1294. Springer, Berlin, Heidelberg, which is incorporated herein by reference in its entirety for such purpose.

In some embodiments, the exemplary IM messenger application (client) with the exemplary inventive IM computer system are configured to encrypt interactions by utilizing the forward secrecy end-to-end encryption for delayed sessions (e.g., due to sender and/or receiver being offline). For example, in some embodiments, the exemplary IM messenger application (client) with the exemplary inventive IM computer system are configured to, for example, without limitation, generate one random secret key per session to complete a key agreement. This means that the compromise of one session cannot compromise others as well, and there is no one secret value whose acquisition would compromise multiple sessions. For example, in some embodiments, the exemplary IM messenger application (client) with the exemplary inventive IM computer system may be configured to implement forward secrecy end-to-end encryption for delayed sessions based, at least in part, on Diffie-Hellman key exchange (DHE-RSA, DHE-DSA) and/or elliptic curve Diffie-Hellman key exchange (ECDHE-RSA, ECDHE-ECDSA). See e.g., Cremers, C. & Feltz, Beyond eCK: perfect forward secrecy under actor compromise and ephemeral-key reveal. In M. Des. Codes Cryptogr. (2015) 74: 183.

For example, in some embodiments, the exemplary IM messenger application (client) with the exemplary inventive IM computer system may be configured to implement forward secrecy end-to-end encryption for delayed sessions based, at least in part, on Double Ratchet Algorithm. See. e.g., Unger, Nik; Dechand, Sergej; Bonneau, Joseph; Fahl, Sascha; Perl, Henning; Goldberg, Ian; Smith, Matthew (17-21 May 2015). SoK: Secure Messaging. In 2015 IEEE Symposium on Security and Privacy. San Jose, Calif.: Institute of Electrical and Electronics Engineers: 241.

As detailed herein, in some embodiments, the exemplary IM messenger application (client) with the exemplary inventive IM computer system are configured to operate as a decentralised distributed network for instant message communication. For example, the exemplary IM messenger application (client) with the exemplary inventive IM computer system do not require a so-called "central" server for user authorisation procedures. In contrast, in some embodiments, the exemplary IM messenger application (client) with the exemplary inventive IM computer system are configured to generate keys (e.g., a pair of the public key and the private key) directly from, for example without limitation, the user's password. For example, the exemplary IM messenger application (client) with the exemplary inventive IM computer system can be configured to require having a new user's profile for each new password.

In some embodiments, the exemplary IM messenger application (client) with the exemplary inventive IM computer system are configured to utilize an exemplary inventive protocol of key agreement that is based on the asymmetric cryptography. For example, when both sender(s) and recipient(s) are online, in some embodiments, the exemplary IM messenger application (client) with the exemplary inventive IM computer system are configured to transfer messages between sender(s) and recipient(s) directly. This is done in order not to overload the network. In contrast, when, for example, the recipient(s) are offline, in some embodiments, the exemplary IM messenger application (client) with the exemplary inventive IM computer system are configured to allow sender(s) to create a message exchange session in a non-interactive way, which can be serialised as a compact session state and stored on an exemplary inventive mesh network. In turn, in some embodiments, the exemplary IM messenger application (client) with the exemplary inventive IM computer system are configured to allow recipient(s) to restore the session from the serialised state and, if authorised, view and/or create session messages. In some embodiments, the exemplary IM messenger application (client) with the exemplary inventive IM computer system are configured so that the inventive session state can act as encrypted storage with access from one or more users.

In some embodiments, the exemplary IM messenger application (client) with the exemplary inventive IM computer system are configured to transfer IM messages may be transferred as a formatted text. In some embodiments, the exemplary IM messenger application (client) with the exemplary inventive IM computer system are configured to implement file sharing as, for example without limitation, a torrent file exchange that has no limitations on the file size nor the file content.

Typically, the end-to-end encryption requires an interactive communication protocol between both parties of the communication. In contrast, in some embodiments, the exemplary IM messenger application (client) with the exemplary inventive IM computer system are configured to support the end-to-end encryption without the interactive protocol (i.e., at least one party to the communication is offline).

Figure 1:
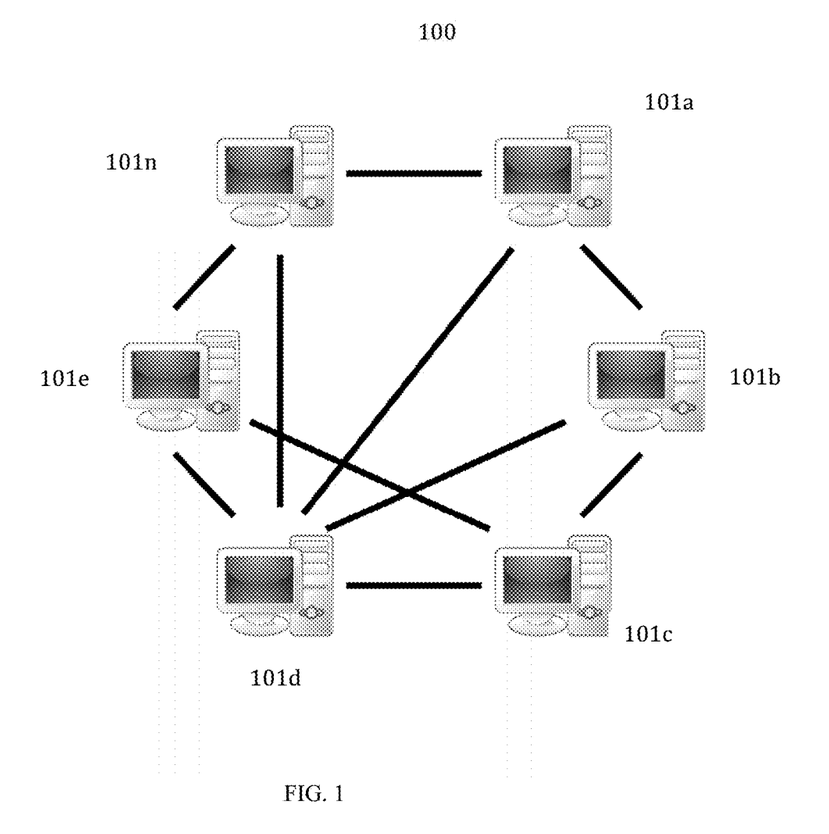
FIGS. 1-2 show one or more schematic flow diagrams, certain computer-based architectures, and/or screenshots of various specialized graphical user interfaces which are illustrative of some exemplary aspects of at least some embodiments of the present disclosure.

Illustrative Examples of Exemplary Inventive Communication Protocol that the Exemplary IM Messenger Application (Client) with the Exemplary Inventive IM Computer System are Configured to Utilized in Accordance with at Least Some Embodiments FIG. 1 illustrates an exemplary architecture of the exemplary inventive decentralised distributed mesh network of the exemplary inventive IM computer system (100). For example, in some embodiments, each node (101a . . . 101n) in FIG. 1 illustrates user's computing device which executes the exemplary IM messenger application (client) and which can be, without limitation at least one selected from the group of desktop, laptop, mobile device (e.g., tablet, smartphone, etc.), Internet-of-Things device (e.g., smart thermostat), and etc. . . . . .

Table 1 provides an illustrative example of the inventive interaction protocol that the exemplary IM messenger applications (clients) with the exemplary inventive IM computer system are configured to utilized in accordance with at least some embodiments. In Table 1, terms "receiver" and "sender" respectively correspond to the exemplary IM messenger application (client) being executed on each respective communication side.

TABLE 1

| Before sending message: |
| --- |
| 1.1 The receiver saves the following information on the exemplary inventive mesh network: the public master key in open access and the number of N ephemeral public-keys, signed with the secret master key. |
| At the sender's side: |
| 2.1 The sender gets the receiver's public information on the exemplary inventive mesh network.<br>2.2 The sender authenticates the ephemeral keys by using the receiver's public key.<br>2.3 The sender chooses a random sample S from the N ephemeral keys.<br>2.4 The sender applies the sample S, the own private key and the random seed R to generate the session key.<br>2.5 The sender applies the session key to encrypt the message.<br>2.6 The sender encrypts the session information with the receiver's public master key: sender id, seed R and the information required to restore the set S.<br>2.7 The sender saves the encrypted message and the encrypted session information on the exemplary inventive mesh network. |
| At the receiver's side: |
| 3.1 The receiver gets the sender's public information from the exemplary inventive mesh network. |

Figure 2:
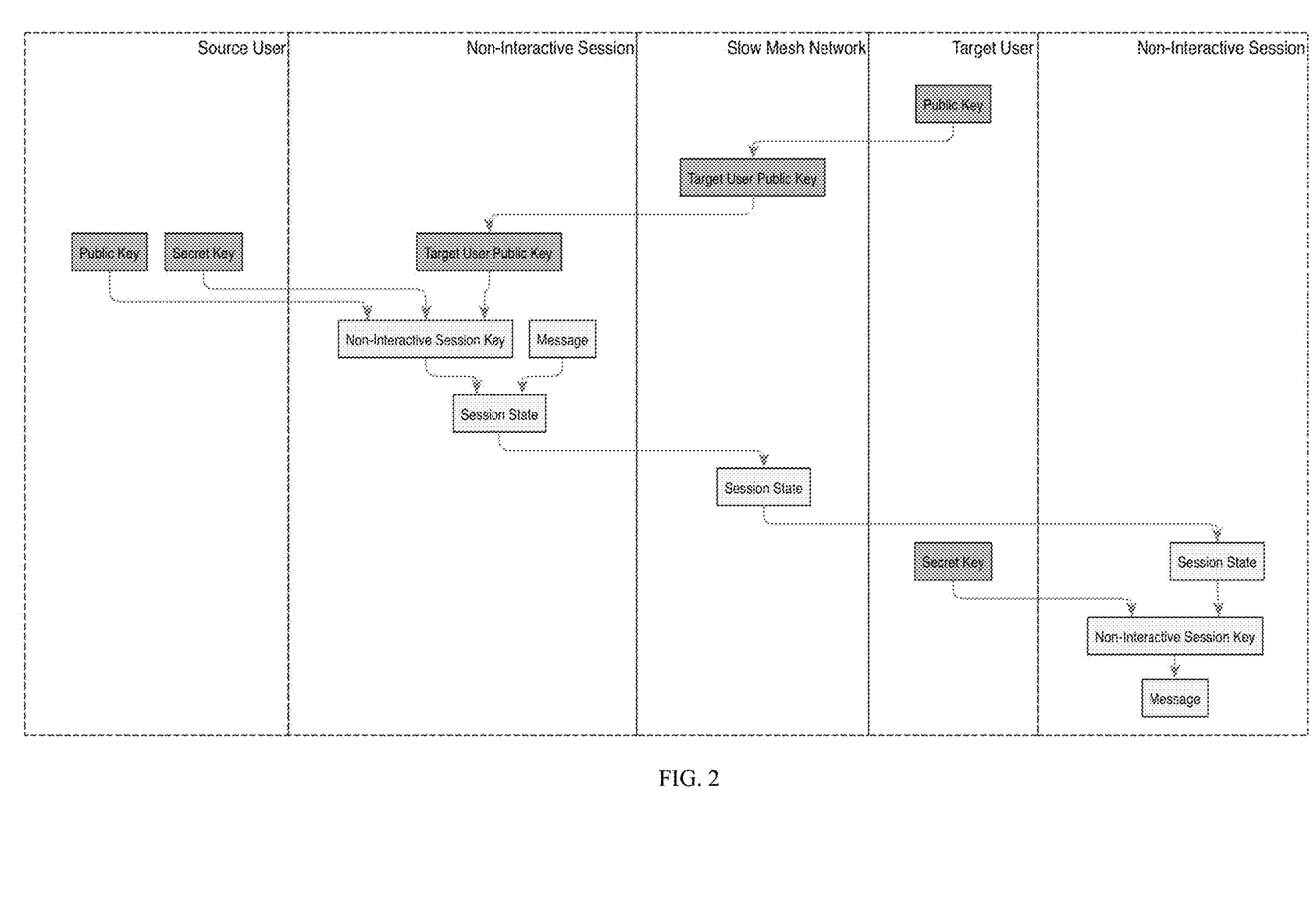

Similarly, to Table 1, FIG. 2 also illustrates an exemplary inventive interaction protocol that, in some embodiments, the exemplary IM messenger applications (clients) are configured to utilize to exchange IM communication over the exemplary inventive decentralised distributed mesh network of the exemplary inventive IM computer system (100). For example, referring to FIG. 2, item Source User (sender/senders) is a user or a group of users who send information over the inventive network. Item Target User (recipient/recipients) is a user or a group of users who receive the information sent by the Source User. The label Non-Interactive Session identifies an exemplary inventive IM message exchange protocol between the Source User and the Target User, during which the message exchange data is serialised and de-serialised as the Session State. For example, item Message contains information which the Source User exchanges with the Target User. In some embodiments, the exemplary inventive decentralised distributed mesh network of the exemplary inventive IM computer system (100) is a Slow Mesh Network that is a network topology in which the infrastructure nodes connect directly, dynamically and non-hierarchically to as many other nodes as possible and cooperate with one another to route data from/to clients. Items Public Key and Secret Key identify a pair of keys used by the exemplary inventive asymmetric cryptographic technique of the exemplary inventive IM computer system (100). For example, the Public Key may be disseminated widely, and the Secret Key is only known to the owner. In accordance with exemplary inventive interaction protocol of FIG. 2, the present invention accomplishes, for example (without limitation), (1) the authentication, where the Public Key verifies that a holder of the paired Secret Key sent the message, and (2) encryption, where only the paired Secret Key holder can decrypt the message encrypted with the Public Key. Item Non-Interactive Session Key is a single-use symmetric key used for encrypting all IM messages in one inventive communication session.

In some embodiments, by utilizing the deniability encryption technique(s), the exemplary IM messenger application (client) with the exemplary inventive IM computer system are configured such that the session information depends only on the receiver's public data and hence may be forged by any other user. The opportunity of forging guarantees the difficulty in proving that the information is generated by the sender. At the same time, this information is used to decrypt messages which can be only done by the receiver.

In some embodiments, the exemplary IM messenger application (client) with the exemplary inventive IM computer system are configured to support uses such as, but not limited to, mobile-device and computer games, mobile-device and computer messengers and mobile-device and computer applications of more general scope, and similar others.

In some embodiments, the exemplary IM messenger application (client) with the exemplary inventive IM computer system are configured to offer an opportunity to its users to incorporate computer-generated imagery into messages, where the computer-generated imagery has been generated by utilizing one or more techniques detailed in U.S. Pat. Nos. 10,049,260, 10,129,476, 10,204,438 and 10,289,899; U.S. patent application Ser. No. 16/034,267; each of which is incorporated herein by reference in its entirety for such purpose.

In some embodiments, the incorporated computer-generated imagery may be in the form of a still imagery (e.g., picture, snapshot) or moving imagery (e.g., video). In some embodiments, the incorporated computer-generated imagery may be in the form of a visual mask being layered over a user's face. In some embodiments, the incorporated computer-generated imagery may be in the form of a visual mask being layered over a user's face and/or one or more suitable virtual reality effects (e.g., avatar, etc.) and/or one or more augmented reality effects (e.g., avatar within a real-life imagery, etc.). In some embodiments, users of the exemplary IM messenger application (client) with the exemplary inventive IM computer system may be given an opportunity to add the incorporated computer-generated imagery via emoji-like choice menus programmed as part of the exemplary IM messenger application (client). In some embodiments, users of the exemplary IM messenger application (client) with the exemplary inventive IM computer system may be given an opportunity to launch one or more additional applications (e.g., camera application, image editing tool, etc.) to add/edit the computer-generated imagery before incorporating such imagery in to one or more messages. In some embodiments, the exemplary IM messenger application (client) with the exemplary inventive IM computer system may be configured to incorporate the computer-generated imagery on continuous dynamic basis and automatically send messages having such incorporated computer-generated imagery as they become available (e.g., computer-generated imagery generated based at least in part on live recording).

At least some aspects of the present disclosure will now be described with reference to the following numbered clauses.

Clause 1. A method, comprising:
accessing, with a sending client, encryption data associated with a receiving client on a distributed mesh network;
wherein the distributed mesh network includes a plurality of nodes coordinated to route message;
wherein the encryption data is signed by a receiver public key associated with the receiving client;
forming, by a processor of the sending client, a non-interactive message exchange session on the distributed mesh network;
generating, by the processor, a first session key based on at least the encryption data and a sender secret key associated with the sending client;
encrypting, by the processor, a message using the first session key to produce an encrypted message;
encrypting, by the processor, session information using the receiver public key to produce encrypted session information;
producing, by the processor, a session state comprising:
the encrypted message; and
the encrypted session information; and
storing the session state in the non-interactive message exchange session on the distributed mesh network;
wherein the receiving client is configured to
access the session state in the non-interactive message exchange session on the distributed mesh network;
decrypt the encrypted session information with a paired receiver secret key paired with the receiver public key to reproduce the session information;
generate a second session key using the session information and a sender public key paired with the sender secret key; and
decrypt the message using the second session key.

Clause 2. A method comprising:
storing, with a receiving client, on a distributed mesh network a receiver public key and encryption data associated with the receiving client;
wherein the distributed mesh network includes a plurality of nodes coordinated to route message;
wherein the encryption data is signed by a receiver public key associated with the receiving client;
wherein a sending client is configured to:
access the distributed mesh network to extract the receiver public key and the encryption data;
form a non-interactive message exchange session on the distributed mesh network;
generate a first session key based on at least the encryption data and a sender secret key associated with the sending client;
encrypt a message using the first session key to produce an encrypted message;
encrypt session information using the receiver public key to produce encrypted session information;
produce a session state comprising:
the encrypted message; and
the encrypted session information; and
store the session state in the non-interactive message exchange session on the distributed mesh network;
decrypting, by a processor of the receiving client, the encrypted session information with a paired receiver secret key paired with the receiver public key to reproduce the session information;
generating, by the processor, a second session key using the session information and a sender public key paired with the sender secret key; and
decrypting, by the processor, the message using the second session key.

Clause 3. The method of clause 1 or 2, wherein the encryption information comprises a set of ephemeral public keys.

Clause 4. The method of clause 3, further comprising authenticating the set of ephemeral public keys using the receiver public key.

Clause 5. The method of clause 3, further comprising randomly selecting a subset of ephemeral public keys from the set of ephemeral public keys.

Clause 6. The method of clause 3, wherein the session information comprises:
a sender identification associated with the sender client;
a random seed; and
subset information that restores a subset of ephemeral public keys randomly selected from the set of ephemeral public keys.

Clause 7. The method of clause 1 or 2, wherein the message comprises an entirety of a text-based message.

Clause 8. The method of clause 1 or 2, wherein the message comprises a portion of a file in a torrent file exchange.

Clause 9. The method of clause 1 or 2, wherein the distributed mesh network comprises a Slow Mesh Network.

While a number of embodiments of the present invention have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

The invention claimed is:

1. A method for instant message communication in a distributed network environment, the method comprising:
accessing, with a sending client, encryption data associated with a receiving client on a distributed mesh network;
wherein the distributed mesh network includes a plurality of nodes coordinated to route message;
wherein the encryption data is signed by a receiver public key associated with the receiving client;
forming, by a processor of the sending client, a non-interactive message exchange session on the distributed mesh network, wherein at least one of the sending client and the receiving client is offline;
generating, by the processor, a first session key based on at least the encryption data and a sender secret key associated with the sending client;

encrypting, by the processor, a message using the first session key to produce an encrypted message;

encrypting, by the processor, session information of the non-interactive message exchange session using the receiver public key to produce encrypted session information;

producing, by the processor, a session state comprising:
the encrypted message; and
the encrypted session information;

storing the session state in the non-interactive message exchange session on the distributed mesh network;

wherein the receiving client is configured to
access the session state in the non-interactive message exchange session on the distributed mesh network;
decrypt the encrypted session information with a paired receiver secret key paired with the receiver public key to reproduce the session information;
generate a second session key using the session information and a sender public key paired with the sender secret key; and
decrypt the message using the second session key.

2. The method of claim 1, wherein the encryption information comprises a set of ephemeral public keys.

3. The method of claim 2, further comprising authenticating the set of ephemeral public keys using the receiver public key.

4. The method of claim 2, further comprising randomly selecting a subset of ephemeral public keys from the set of ephemeral public keys.

5. The method of claim 2, wherein the session information comprises:
a sender identification associated with the sender client;
a random seed; and
subset information that restores a subset of ephemeral public keys randomly selected from the set of ephemeral public keys.

6. The method of claim 1, wherein the message comprises an entirety of a text-based message.

7. The method of claim 1, wherein the message comprises a portion of a file in a torrent file exchange.

8. The method of claim 1, wherein the distributed mesh network comprises a Slow Mesh Network.

9. A method for instant message communication in a distributed network environment, the method comprising:
storing, with a receiving client, on a distributed mesh network a receiver public key and encryption data associated with the receiving client;
wherein the distributed mesh network includes a plurality of nodes coordinated to route message;
wherein the encryption data is signed by a receiver public key associated with the receiving client;
wherein a sending client is configured to:
access the distributed mesh network to extract the receiver public key and the encryption data;
form a non-interactive message exchange session on the distributed mesh network, wherein at least one of the sending client and the receiving client is offline;
generate a first session key based on at least the encryption data and a sender secret key associated with the sending client;
encrypt a message using the first session key to produce an encrypted message;
encrypt session information of the non-interactive message exchange session using the receiver public key to produce encrypted session information;
produce a session state comprising:
the encrypted message; and
the encrypted session information;
store the session state in the non-interactive message exchange session on the distributed mesh network;
accessing, by a processor of the receiving client, the session state in the non-interactive message exchange session on the distributed mesh network;
decrypting, by a processor of the receiving client, the encrypted session information with a paired receiver secret key paired with the receiver public key to reproduce the session information;
generating, by the processor, a second session key using the session information and a sender public key paired with the sender secret key; and decrypting, by the processor, the message using the second session key.

10. The method of claim 9, wherein the encryption information comprises a set of ephemeral public keys.

11. The method of claim 10, further comprising signing the set of ephemeral public keys using the paired receiver private key.

12. The method of claim 10, wherein the sending client is further configured to randomly select a subset of ephemeral public keys from the set of ephemeral public keys.

13. The method of claim 10, further comprising restoring a subset of ephemeral public keys randomly selected from the set of ephemeral public keys using the session information, the session information comprising:
a sender identification associated with the sender client;
a random seed; and
subset information for restoring the subset of ephemeral public keys.

14. The method of claim 9, wherein the message comprises an entirety of a text-based message.

15. The method of claim 9, wherein the message comprises a portion of a file in a torrent file exchange.

16. The method of claim 9, wherein the distributed mesh network comprises a Slow Mesh Network.

17. A system for instant message communication in a distributed network environment, the system comprising:
a distributed mesh network comprising a plurality of clients;
wherein the distributed mesh network includes a plurality of nodes comprising computing devices, wherein the plurality of nodes are coordinated to route message;
a first client of the plurality of clients, comprising at least a first processing device; and
a second client of the plurality of clients, comprising at least a second processing device;
wherein the first client is configured to:
access encryption data associated with a second client of the plurality of clients;
wherein the encryption data is signed by a second public key associated with the second client;
form a non-interactive message exchange session on the distributed mesh network, wherein at least one of the first client and the second client is offline;
generate a first session key based on at least the encryption data and a first secret key associated with the first client;
encrypt a message using the first session key to produce an encrypted message;

encrypt session information of the non-interactive message exchange session using the second public key to produce encrypted session information;
produce a session state comprising:
the encrypted message; and
the encrypted session information;
store the session state in the non-interactive message exchange session on the distributed mesh network; and
wherein the first client is configured to:
access the session state in the non-interactive message exchange session on the distributed mesh network;
decrypt the encrypted session information with a paired second secret key paired with the first public key to reproduce the session information;
generate a second session key using the session information and a first public key paired with the first secret key; and
decrypt the message using the second session key.

18. The system of claim 17, wherein the non-interactive message exchange session is distributed across storage of one or more of the plurality of clients.

19. The system of claim 17, wherein each of the plurality of clients comprises a node of the distributed mesh network.

20. The system of claim 17, wherein the distributed mesh network comprises a Slow Mesh Network.

* * * * *